(12) United States Patent
Garcia et al.

(10) Patent No.: US 8,159,943 B2
(45) Date of Patent: Apr. 17, 2012

(54) METHOD OF FORMING PROTOCOL DATA UNITS, PROTOCOL DATA UNITS AND PROTOCOL DATA UNIT GENERATION APPARATUS

(75) Inventors: Francisco Javier Garcia, Edinburgh (GB); Robert Gardner, Glasgow (GB); Chris Das, Fort Collins, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1283 days.

(21) Appl. No.: 11/228,124

(22) Filed: Sep. 16, 2005

(65) Prior Publication Data

US 2007/0064618 A1    Mar. 22, 2007

(51) Int. Cl.
G01R 31/08 (2006.01)
H04L 12/28 (2006.01)
H04J 3/16 (2006.01)
G06F 15/16 (2006.01)

(52) U.S. Cl. ........ 370/231; 370/252; 370/392; 370/471; 709/235

(58) Field of Classification Search .......... 370/229–235, 370/252, 351, 389, 392, 395.3, 395.21, 395.32, 370/395.5, 401, 471, 465–467, 395; 709/232–235; 714/748–750, 18
See application file for complete search history.

(56) References Cited

U.S. PATENT DOCUMENTS

| | | | | |
|---|---|---|---|---|
| 6,076,113 | A | 6/2000 | Ramanathan et al. | 709/235 |
| 6,363,056 | B1 | 3/2002 | Beigi et al. | 370/252 |
| 6,662,223 | B1 * | 12/2003 | Zhang et al. | 709/224 |
| 7,366,096 | B2 * | 4/2008 | Swami | 370/231 |
| 2003/0048750 | A1 * | 3/2003 | Kobayashi | 370/229 |
| 2003/0086422 | A1 | 5/2003 | Klinker et al. | 370/389 |
| 2004/0052259 | A1 * | 3/2004 | Garcia et al. | 370/392 |
| 2004/0120252 | A1 * | 6/2004 | Bowen et al. | 370/229 |

FOREIGN PATENT DOCUMENTS

EP    1 401 147    3/2004

OTHER PUBLICATIONS

Mark Allman, "Measuring End-to-End Bulk Transfer Capacity", 2001, Proceedings of the 1st ACM SIGCOMM Workshop on Internet Measurement , pp. 139-143.*
European Search Report for Application No. EP 06 120 469.9 dated Dec. 11, 2006.
Botta et al. "On the Performance of Bandwidth Estimation Tools". Systems Communications, 2005. Proceedings Montreal, Canada Aug. 14-17, 2005, Piscataway, New Jersey, United States, IEEE, Aug. 14, 2005, pp. 287-292.

* cited by examiner

*Primary Examiner* — Kwang B Yao
*Assistant Examiner* — Redentor Pasia
(74) *Attorney, Agent, or Firm* — Volentine & Whitt, PLLC

(57) ABSTRACT

A source host comprising a processing resource that supports a kernel space and a user space. A socket layer is supported by the kernel space and allows a measurement application residing in the user space to instruct a protocol layer to form a plurality of UDP test packets for transmission, from the source host, to a destination node in a communications network. The plurality of test packets employ source-based routing and an alternative congestion control algorithm is implemented by the protocol layer to that supported by the communications network.

13 Claims, 6 Drawing Sheets

METHOD OF FORMING PROTOCOL DATA UNITS, PROTOCOL DATA UNITS AND PROTOCOL DATA UNIT GENERATION APPARATUS

FIELD OF THE INVENTION

The present invention relates to a method of forming protocol data units of the type, for example, injected into a communications network for measuring performance in relation to a first node of the communications network. The present invention also relates to a plurality of protocol data units of the type, for example, that are injected into the communications network for measuring performance in relation to the first node of the communications network. The present invention further relates to a protocol data unit generation apparatus of the type, for example, that injects packets into the communications network.

DISCUSSION OF THE BACKGROUND ART

In the field of data communications, the success of the Internet has resulted in many businesses, academic institutions and research institutes relying upon the transfer of large volumes of data on a daily basis to support software applications used. However, such organizations are encountering increasing difficulty obtaining communications bandwidths required, and so various Internet research groups are trying to derive measurements that can be used to compare suitability of a path through a communications network with other paths through the communications network for various software applications on a hop-by-hop, transport service provider-by-transport service provider, or Internet Service Provider (ISP)-by-ISP basis. Indeed, there are many applications that can require bulk data throughput, for example: a File Transport Protocol (FTP), or a HyperText Transport Protocol (HTTP), when used to download large images, videos, music and/or large documents, or even large compressed archive files.

One known metric for assisting in the above-mentioned comparison is a so-called Bulk Transfer Capacity (BTC) measurement introduced and described in Request For Comments (RFC) 3148 (www.faqs.org). The BTC measurement provides a network operator or network administrator with an ability to determine whether the communications network is able to support and transfer significant volumes of data over a single congestion-aware transport connection. The BTC measurement can be used to study sustainable transfer capacity along a communications path for bulk data transfers, based upon an expectation that during a course of a communications session, a single congestion-aware transport path reaches equilibrium, i.e. flow control steady state, with the communications network.

An example of a tool for making BTC measurements is known as "TReno" and is described in "Diagnosing Internet Congestion with Transport Layer Performance Tool" (M. Mathis, Proceedings of INET'96, June 1996). TReno (Traceroute RENO) is designed to test network performance under load conditions and employs a congestion control mechanism similar to that of Transmission Control Protocol (TCP), currently the most commonly used Transport Protocol in the Internet.

TReno uses the same technique as a well-known "traceroute" application to probe the communications network, the technique being reliance upon a standard implementation of the widely-deployed Internet Control Message Protocol (ICMP) protocol (as defined in RFC 792). By sending out User Datagram Protocol (UDP) packets with a sufficiently low Time-To-Live (TTL) field, hosts and routers along the path to a final destination send ICMP Time Exceeded messages back that have similar characteristics to (TCP) Acknowledgement (ACK) packets. In particular, such ICMP error messages can be solicited by setting the TTL count to expire just before the UDP packet reaches the final destination. Using this feedback mechanism, TReno is able to send packets at a controlled rate and thus emulate a congestion-aware transport mechanism and perform a BTC measurement. TReno also has a purely ICMP mode, which uses ICMP ECHO Requests instead of low TTL UDP packets.

The TReno tool has been implemented on an IPv4 network with limited success, because it relies upon ICMP messages for determining the BTC measurement. It is known that routers often assign very low priority to the generation of ICMP ECHO requests and ICMP Time Exceeded messages. Furthermore, when experiencing congestion, the routers are especially unlikely to generate these messages with the timeliness and reliability required to assure accuracy in the derived BTC measurements.

Also, since the ICMP protocol conveys potentially multiple so-called "opaque objects" that need interpretation at a target or recipient, it is not uncommon for these messages to be processed in, what is typically referred to as, a "slow path" within routers. Thus, such ICMP messages receive less favourable treatment than traffic that the measurement tool is trying to emulate and measure. Further, some known operating systems also limit a rate at which ICMP messages are used to handle errors or solicit information from neighbouring nodes, for example routers and/or switches. Since the ICMP messages constitute low priority traffic, actions are typically taken by nodes to limit the costs of handling such messages and to avoid congesting the network with such additional traffic.

Additionally, at least in relation to IPv6, RFC 2463 requires IPv6 nodes to specifically limit the rate of ICMPv6 error messages sent by IPv6 nodes in order to limit the bandwidth and forwarding costs incurred in sending the ICMPv6 error messages. Therefore, neither ICMP nor ICMPv6 messages can be relied upon in order to make accurate BTC measurements.

Transit providers, however, need to obtain a BTC measurement and other measurements that are not prone to the limitations or inefficiencies of the mechanisms mentioned above. Additionally, the measurement techniques must still make such measurements statelessly, i.e. make no assumptions about the existence of state, for example in the form of a congestion-aware mechanism that can assist in making such a measurement, at a target end-point or end-points along the path being tested. However, many known tools rely on state being deployed, i.e. additional functionality, along the path being tested or at the end-point or end-points to facilitate the BTC or other similar measurements.

One other known stateful measurement technique, known as "Cap" is described in "Measuring End-to-End Bulk Transfer Capacity" (M. Allman, ACM SIGCOM Internet Measurement Workshop 2001, San Francisco, USA, November 1-2). Like TReno, Cap is a tool that operates in relation to congestion-aware transports. Although other research groups are creating similar tools, these tools are based upon extensions, uses, adaptations or imitations of the TReno or Cap tools.

Both Cap and TReno emulate a type of "idealized" TCP using UDP packets. It is to be noted that there are many variations of TCP being used in current communications networks, because different hosts have different operating systems that implement the TCP protocol in slightly different albeit largely compatible ways, as described in various RFCs.

Additionally, routers in communications networks typically do not support the TCP at all; the TCP operates in relation to connections between hosts and so for one or more routers involved in a measurement to support the TCP requires functionality of the one or more routers to be augmented, i.e. the router has to be provided with state in relation to the TCP. This is undesirable, or even not permitted in some communications networks. Further, in relation to Cap, two collaborating end-points are also required, one to act as a source and the other to act as a sink at opposite ends of the communications path under test. Consequently, Cap is also classified as a stateful measurement tool that is congestion-aware. As mentioned above, it is desirable to avoid the provision of state in network nodes to support measurements.

SUMMARY OF THE INVENTION

According to a first aspect of the present invention, there is provided a method of forming protocol data units for measuring performance in relation to a first node of a communications network capable of supporting a congestion-aware connection in accordance with a first congestion control algorithm, the method comprising the steps of: generating a plurality of protocol data units, each of the plurality of protocol data units having a data structure definition supporting routing path selection and supporting congestion control in accordance with a second congestion control algorithm in place of the first congestion control algorithm; configuring the each of the plurality of protocol data units by setting a source address, a destination address and at least one routing address in the each of the plurality of protocol data units so as to cause the plurality of protocol data units, when sent, to follow a round-trip path via the first node.

The congestion-aware connection may include the first node.

The source address and the destination address may correspond to a same host. The source address and the destination address may be identical.

The each of the plurality of protocol data units may comprise a routing header constituting support for the routing path selection.

The second congestion control algorithm may implement congestion control functionality compatible with the performance measurement.

The performance measurement may be performed by a network performance application or tool.

The first congestion control algorithm may be a Transmission Control Protocol algorithm.

The plurality of protocol data units may be a plurality of User Datagram Protocol datagrams.

The plurality of User Datagram Protocol datagrams may be User Datagram Protocol packets.

The plurality of protocol data units may relate to a Bulk Transfer Capacity measurement.

The plurality of protocol data units may constitute a plurality of test protocol data units for the Bulk Transfer Capacity measurement.

The plurality of protocol data units may follow, when sent, the round-trip path via a number of nodes in the communications network, the number of nodes including the first node.

The round-trip path may comprise an outbound path series of network nodes and a return path series of network nodes, the return path series being a reverse of the outbound path series.

According to a second aspect of the present invention, there is provided a method of measuring performance in relation to a first node of a communications network capable of establishing a congestion-aware connection in accordance with a first congestion control algorithm, the method comprising the steps of: forming a plurality of protocol data units in accordance with the method of forming protocol data units as set forth above in relation to the first aspect of the invention.

The method may further comprise the step of: injecting the plurality of protocol data units into the communications network so as to follow a round-trip path from a host corresponding to the source address back to the host via the first node.

The method may further comprise the step of: deriving at least one metric using the plurality of protocol data units received at the host corresponding to the source address.

The method may further comprise the steps of: providing the each of the protocol data units with respective data indicative of a respective departure time of the each protocol data unit.

The respective data indicative of the respective departure time may be provided by the host corresponding to the source address. The respective data indicative of the respective departure time may be a respective first timestamp.

The method may further comprise the step of: providing the each of the protocol data units with respective data indicative of a respective receipt time of the each protocol data unit.

The respective data indicative of the respective receipt time may be provided by the host corresponding to the source address. The respective data indicative of the respective receipt time may be a respective second timestamp.

According to a third aspect of the present invention, there is provided a protocol data unit generation apparatus for forming protocol data units to measure performance in relation to a first node of a communications network capable of supporting a congestion-aware connection in accordance with a first congestion control algorithm, the apparatus comprising: a processing resource arranged to generate, when in use, a plurality of protocol data units, each of the plurality of protocol data units having a data structure definition supporting routing path selection and supporting congestion control in accordance with a second congestion control algorithm in place of the first congestion control algorithm; wherein the processing resource is further arranged to configure, when in use, the each of the plurality of protocol data units by setting a source address, a destination address and at least one routing address in the each of the plurality of protocol data units so as to cause the plurality of protocol data units, when sent, to follow a round-trip path via the first node.

According to a fourth aspect of the present invention, there is provided a network measurement apparatus comprising the protocol data unit generation apparatus as set forth above in relation to the third aspect of the invention.

According to a fifth aspect of the present invention, there is provided a communications system comprising the protocol data unit generation apparatus as set forth above in relation to the third aspect of the invention.

According to a sixth aspect of the present invention, there is provided a plurality of protocol data units for measuring performance in relation to a first node of a communications network capable of supporting a congestion-aware connection in accordance with a first congestion control algorithm, each of the plurality of protocol data units having a data structure definition supporting routing path selection and supporting congestion control in accordance with a second congestion control algorithm in place of the first congestion control algorithm; wherein a source address, a destination address and at least one routing address in the each of the plurality of protocol data units is set so as to cause the plurality of protocol data units, when sent, to follow a round-trip path via the first node.

It is thus possible to provide a method of forming protocol data units, protocol data units and protocol data unit generation apparatus that employs a so-called "source-based routing" mechanism to execute performance measurements, for example the BTC measurement, independent of any higher-level transport protocol above an Internet Protocol layer, for example using the ICMP. Consequently, the performance measurements are not dependent upon any inherent interpretation of a transport mechanism or any implementations of functionality at target end-systems, such as hosts or routers. Provided so-called "Type 0" routing headers are processed in accordance with RFC 2460, the method is reflective in nature and stateless, i.e. a target or end-point is completely "unaware" that it is being subjected to a performance measurement through active probing.

It is also possible to perform a precise BTC measurement across one or more target nodes before test traffic is reflected back to the source host, each target node being visited in series until a final target node in a path of target nodes reflects the test traffic back to the source host. Further, since all of the test traffic is reflected back to the source host, it is easier to incorporate additional measurement-related data, for example time stamps, into the payload to facilitate other measurements related to the BTC, such as a so-called "response time" measurement.

Additionally, measurement rate restrictions of around 1 Mbps are not applicable, since the plurality of protocol data units formed in accordance with the method are not subject to the rate-limiting characteristics associated with the ICMP messages used by other measurement techniques.

BRIEF DESCRIPTION OF THE DRAWINGS

At least one embodiment of the invention will now be described, by way of example only, with reference to the accompanying drawings, in which.

DETAILED DESCRIPTION OF THE PREFERRED EMBODIMENT

Figure 1:
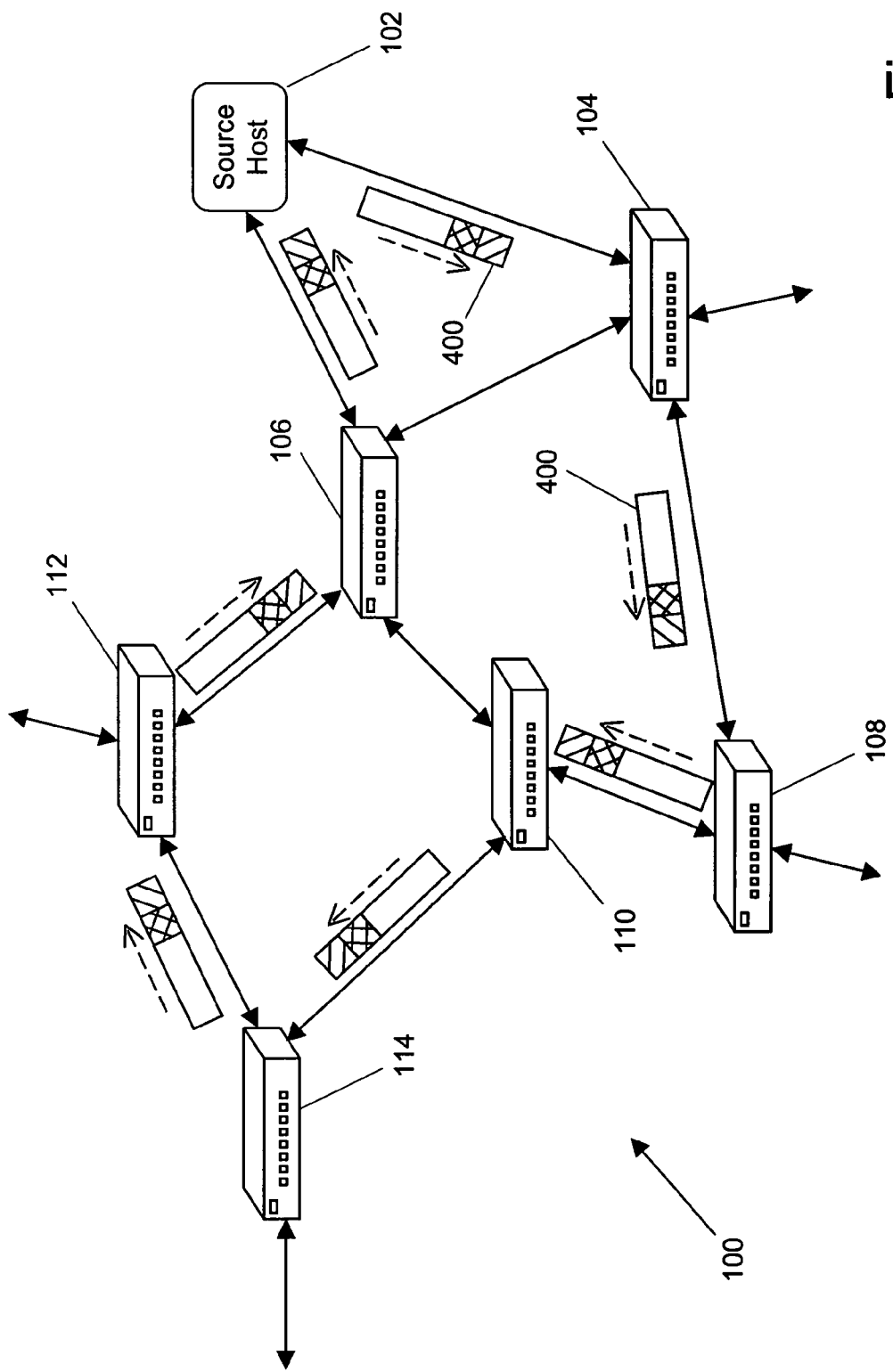
FIG. 1 is a schematic diagram of part of a communications network.

Throughout the following description identical reference numerals will be used to identify like parts.

Referring to FIG. 1, a part of a communications network 100, for example the Internet, comprises a source host 102 coupled to a first intermediate node 104 and a second intermediate node 106. The communications network 100 is an Internet Protocol (IP) network, in particular an IPv6 network and uses a Transmission Control Protocol (TCP) to manage congestion in the communications network 100. A first congestion control algorithm implements the TCP between hosts in the communications network 100.

The first intermediate node 104 is coupled to a third intermediate node 108 as well as the second intermediate node 106. Both the second intermediate node 106 and the third intermediate node 108 are coupled to a fourth intermediate node 110, the second intermediate node 106 also being coupled to a fifth intermediate node 112. Both the fourth and fifth intermediate nodes 110, 112 are coupled to a destination, or target, node 114. The destination node 114 is a node to which packets are to be sent as part of a measurement process.

Although reference is made herein to "nodes", the skilled person will appreciate that the nodes can be hosts or routers, or other network elements with routing and forwarding capabilities, dependent upon the functionality required of the network element at a particular location of the network element in the communications network 100. In this example, the intermediate nodes 104, 106, 108, 110, 112 are routers supporting IPv6 protocol functionality.

In this example, the operation of the source host 102 is modified to perform certain functionality as is described hereinbelow. In contrast, the destination node 114 is not, in this example, modified and is a router that performs normal routing functionality expected of a router.

Figure 2:
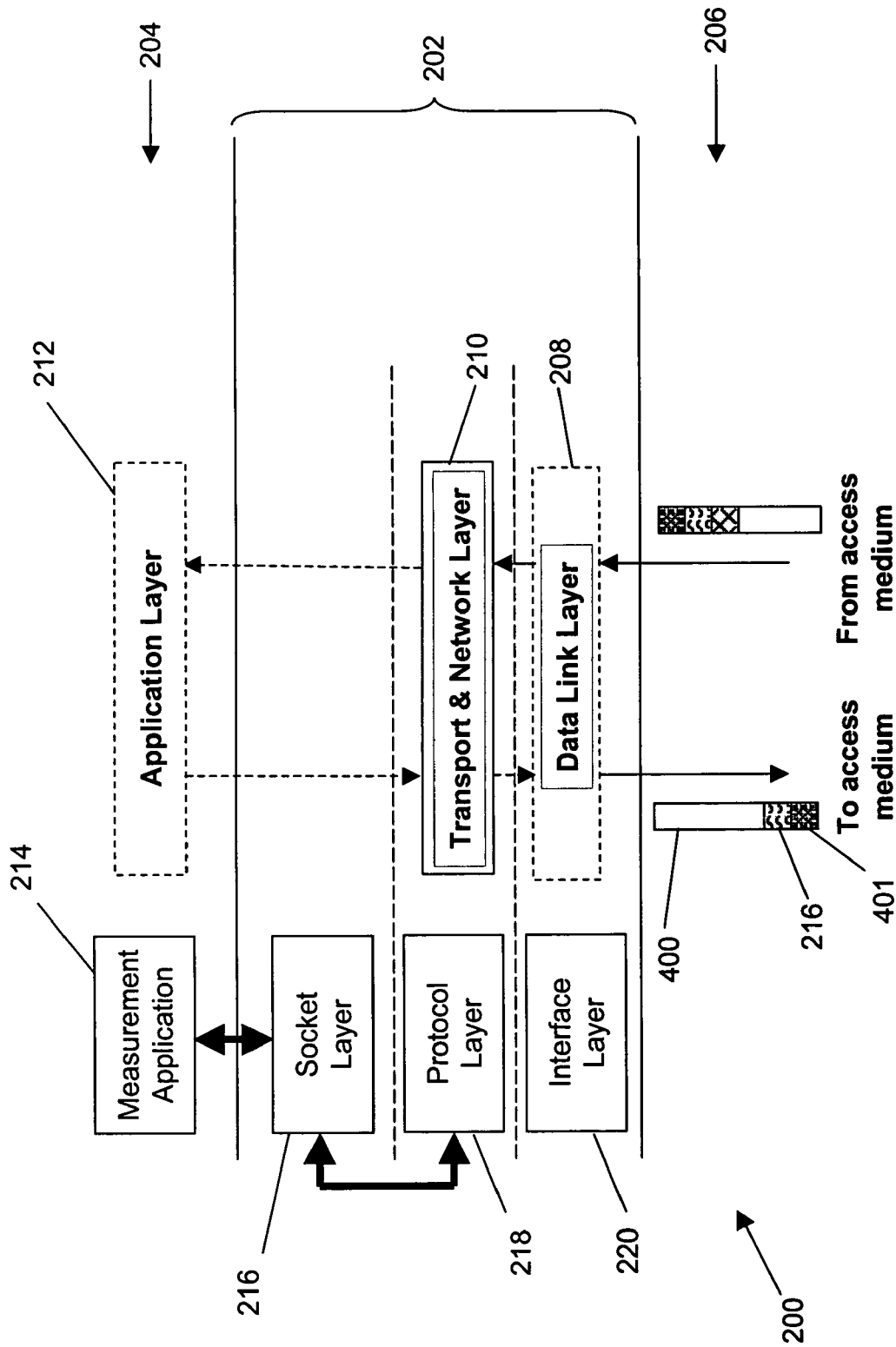
FIG. 2 is a schematic diagram of a processing resource of a source host constituting an embodiment of the invention.

Referring to FIG. 2, the source host 102 comprises a processing resource 200 consisting of, inter alia, at least one microprocessor (not shown), a volatile memory (not shown), for example a Random Access Memory (RAM), a non-volatile memory (not shown), for example a Read Only Memory (ROM). The processing resource 200 supports a kernel space 202, a part of the processing resource 200 being reserved for supporting a protocol stack. In this example, the protocol stack is implemented according to appropriate layers in the Open System Interconnection (OSI) seven-layer Reference Model. Additionally, the processing resource 200 supports a user space 204, a part of the processing resource 200 reserved for the execution of user applications, for example a video streaming server. The processing resource 200 also supports an access medium interface 206, i.e. the Physical layer of the OSI seven-layer Reference Model.

In relation to the protocol stack, the protocol stack comprises, inter alia, a Data Link layer 208, transport and network layers 210, as well as other upper layers, for example an Application Layer 212 (and other layers), and a Physical layer (not shown) below the Data Link layer 208.

Amongst the applications residing in the user space 204, there is a measurement application 214 for injecting measurement packets into the communications network 100.

The kernel space 202 supports a socket Application Programming Interface (API), referred to as a Socket Layer 216 in FIG. 2. In this example, the socket API is implemented as a library of functions. However, in relation to other operating systems, for example Linux, the socket API can be implemented as a set of system calls that interact directly with the kernel space 202. The socket API serves as a protocol-independent interface to protocol-dependent layers that reside below the Socket Layer 216. In this example, the Socket Layer 216 operates in accordance with RFC 2553 ("Basic Socket Interface Extensions for IPv6") and RFC 3542 ("Advanced Sockets Application Program Interface (API) for IPv6"). Further, whilst some operating systems only partially implement the socket API as described in RFC 2553 and RFC 3542 using socket options and ancillary data, it is still nevertheless possible for a user to implement the full functionality of RFC 3542 using the kernel space 202. In the present example, the kernel space 202 implements the full functionality of the socket API.

A number of definitions, stateful structures and stateful code fragments reside in the kernel space 202 and constitute a Protocol Layer 218 supporting the Transport and Network Layers 210. The Protocol Layer 218 resides beneath the Socket Layer 216. In an analogous manner, a further number of definitions, stateful structures and stateful code fragments also reside in the kernel space 202 and constitute an Interface Layer 220 supporting the Data Link Layer 208.

In order to interact with the Protocol Layer 218, the measurement application 214 uses the socket API provided by the Socket Layer 214 to interface with the Protocol Layer 218.

Figure 3:
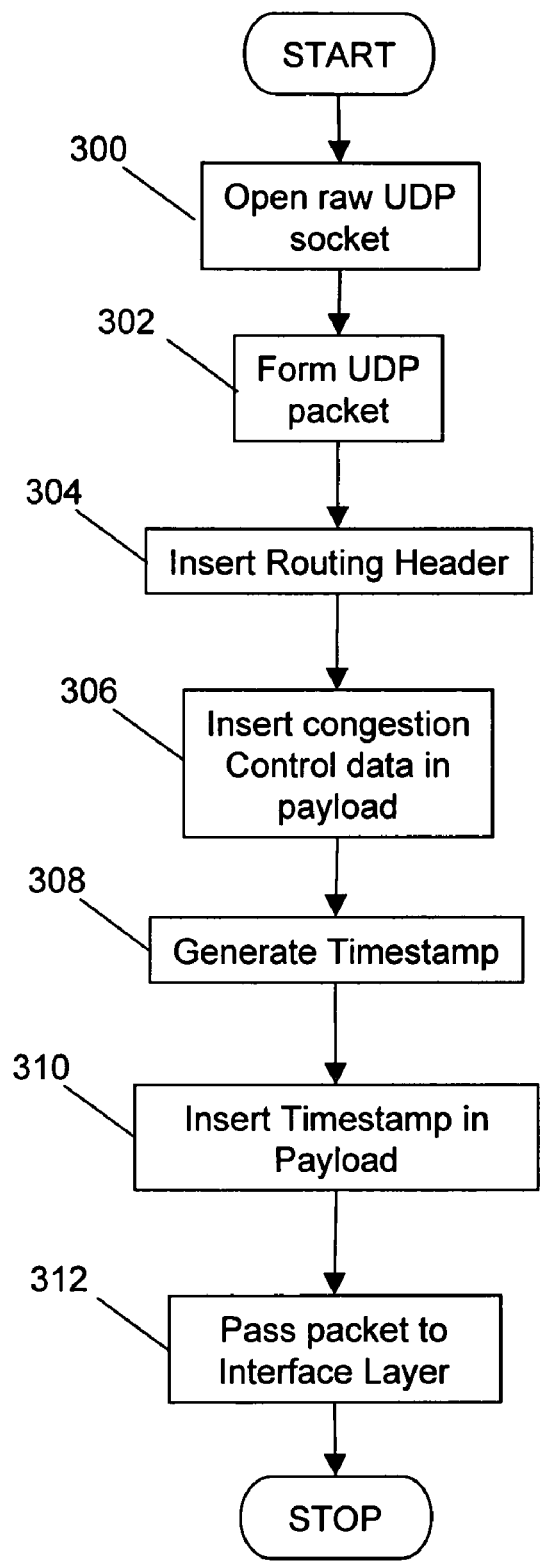
FIG. 3 is a flow diagram of a method of forming a protocol data unit using the processing resource of FIG. 2 and constituting a first embodiment of the invention.

In operation (FIG. 3), the measurement application 214 is arranged to perform a BTC measurement. In order to perform the BTC measurement, the measurement application 214 generates a plurality of packets. For the sake of clarity and conciseness of description, the formation of the plurality of packets will now be described with reference to formation of a single packet.

Figure 4:
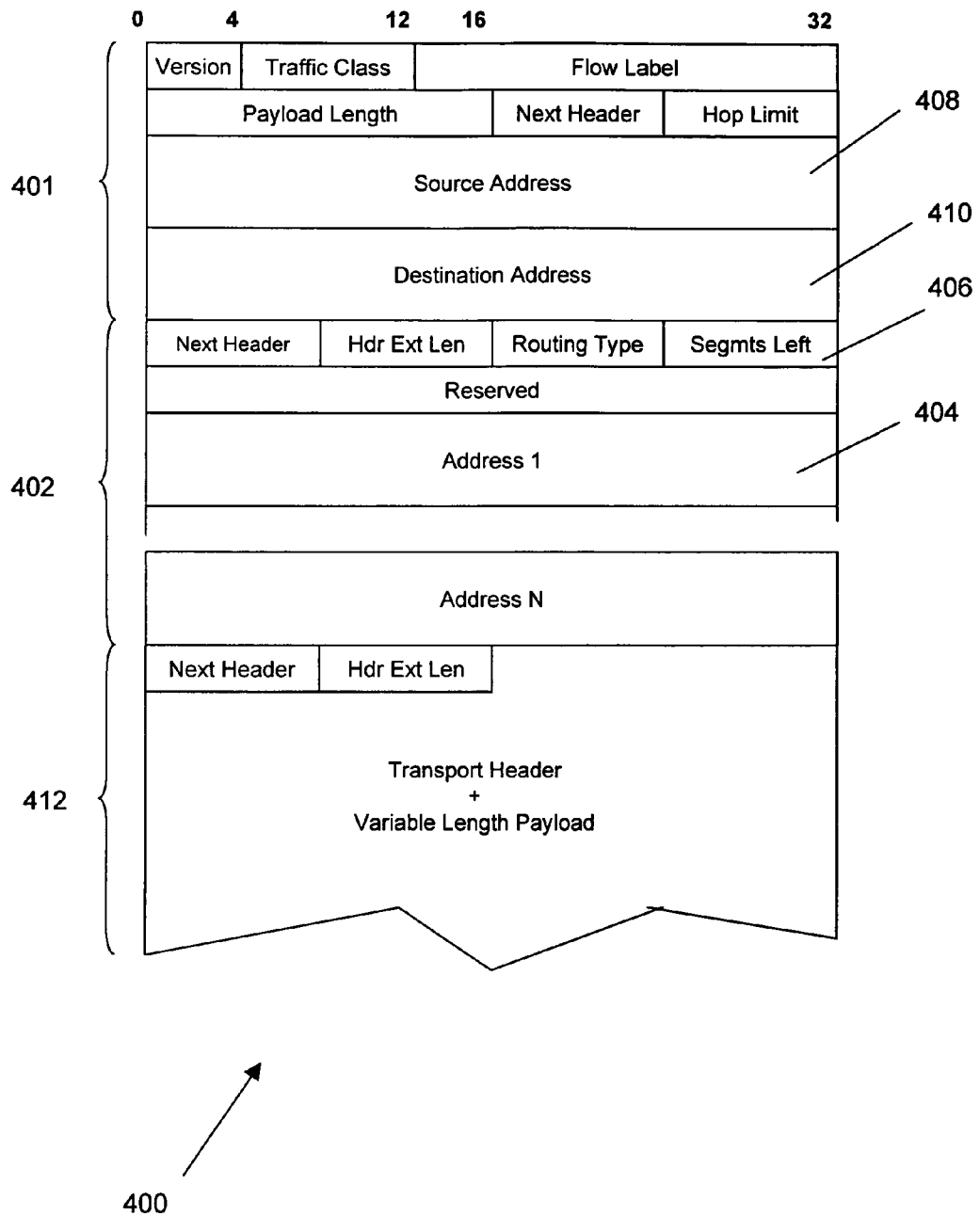
FIG. 4 is a schematic diagram of a data structure definition of the protocol data unit formed by the processing resource of FIG. 2.

In order to form the packet, the measurement application 214 uses the socket layer 216 to open up a UDP socket (Step 300) to the protocol layer 218. Through the UDP socket, the measurement application 214 instructs the protocol layer 218 to form (Step 302) a UDP packet 400 (FIG. 4) having an IPv6 fixed-size header 401.

In order for the UDP packet 400 to be routed to the destination node 114 and ensure return of the UDP packet 400 from the destination node 114, the measurement application 214 passes a first routing IP address corresponding to the destination node 114 to the protocol layer 218. Upon receipt of the first routing IP address, the protocol layer 218 adds a routing header 402 (Step 304) that follows the fixed-size IPv6 header of the UDP packet 400 and adds the first routing IP address as a first address field 404 of the routing header 402. A "segments left" field 406 of the UDP packet 400 is also incremented to reflect the inclusion of the first routing IP address in the UDP packet 400. Additionally, the measurement application 214 passes a source IP address to the protocol layer 218, the source IP address corresponding to the source host 102. The source IP address is then provided in a source address field 408 of the UDP packet 400, and the measurement application 214 also sets a destination address field 410 of the UDP packet 400 to the source IP address corresponding to the source host 102 to ensure return of the UDP packet 400.

The routing header 402 of the UDP packet 400 is followed by a transport header 412, in this example a UDP header, the transport header 412 being followed by a variable length payload.

In the present example, packets are sent by a node and, through the use of the routing header 402, returned to the same node via one or more intermediate routers. This is an example of connectionless data communications and thus the UDP protocol is ideally suited as the transport layer protocol in the formation of such simple packets. However, it is nevertheless necessary to emulate aspects of the congestion control, for example rate limiting of packet transmission, packet loss detection, and/or re-transmission functionality of the TCP in order to carry out the BTC measurement. Consequently, a second, bespoke, congestion control algorithm is implemented by the protocol layer 218 and used in place of the TCP. In this example, the bespoke congestion control algorithm is implemented in accordance with selected aspects of RFCs 793, 1323, 2018, 2140, 2581, 2582, 2861, 2883, 2988, 3042, and/or 3168. It is also implemented in accordance with selected aspects of the Linux 2.4 TCP congestion control algorithm. In particular, congestion avoidance, retransmission timeouts, slow-start, fast retransmit and fast recovery are implemented.

In this example, the protocol layer 218 uses the variable length payload to implement the second congestion control algorithm and so congestion control data is inserted (Step 306) into the variable length payload by the protocol layer 218 implementing the second congestion control algorithm.

Subsequently, a first timestamp is generated (Step 308) by the measurement application 214 and inserted (Step 310) into the variable length payload, the first timestamp constituting a departure time of the UDP packet 400. A unique packet index (based on an incrementing counter) is also inserted into the variable length payload.

The Measurement Application then passes the payload via Socket Layer 216 to the protocol layer 218 which appends a UDP header, an IPv6 header with a source address and destination address (of the first node) and a routing header with an address list of the subsequent nodes that the packet will visit. The final hop listed in the routing header is an address associated with the source host. —The protocol layer handles routing associated with transmission of the packet to the first node.

The protocol layer 218 then passes (step 312) the gradually forming packet 400 to the interface layer 220 for before departure of a finally formed UDP packet 400 from the source host 102.

The UDP packet 400 then leaves the source host 102 and is forwarded to the destination node 114, whereupon receipt of the UDP packet 400, the destination node 114 also exchanges the content of the first address field 404, now the source IP address, with the content of the destination address field 410, namely the first routing IP address corresponding to the destination node 114. Additionally, the segments left field 406 of the UDP packet 400 is decremented by unity.

The destination node 114 then forwards the UDP packet 400 back to the source IP address residing in the destination address field 410, i.e. the source host 102, via a return path. The return path can be via a number of nodes in the communications network 100.

Upon receipt of the UDP packet 400 at the source host 102, the source host 102 appends a second timestamp to the variable length payload, the second timestamp being indicative of a receipt time of the UDP packet 400.

The above-described steps are performed in relation to each of the plurality of packets mentioned above and constituting test packets for the BTC measurement. During transmission and reception of the plurality of packets, the second congestion control algorithm is implemented by the Protocol Layer 218 under the control of the measurement application 214.

Upon receipt of all of the UDP packets sent by the source host 102 in relation to the BTC measurement, the measurement application 214 performs the BTC measurement in accordance with RFC 3148. Since the calculation of the BTC measurement does not differ to that described in RFC 3148, the method of calculation of the BTC measurement after receipt of the plurality of test packets with not be described further herein.

In another embodiment, the plurality of packets follows a predetermined outbound path to the destination node 114 via a predetermined series of network nodes. In this example, the predetermined outbound path requires the plurality of packets to pass via the first intermediate node 104, the third intermediate node 118 and the fourth intermediate node 110. Consequently, the routing header 402 is augmented with a first routing address, $T_1$, corresponding to the first intermediate node 104, a second routing address, $T_2$, corresponding to the third intermediate node 108, a third routing address, $T_3$, corresponding to the fourth intermediate node 110, and a fourth routing address, $T_4$, corresponding to the destination node 114. The first, second, third and fourth routing addresses $T_1$, $T_2$, $T_3$, $T_4$ constitute a queue of routing addresses. As in relation to the previous embodiment, the source address field 408 of the UDP packet 400 is set to a source IP address $S_q$ and the destination field 410 of the UDP packet 400 is set to a destination IP address, $D_q$. In this example, the source IP address $S_q$ and the destination IP address $D_q$ correspond to the same network node, namely the source host 102. Further, in this example the source IP address $S_q$ and the destination IP address $D_q$ are identical. The segments left field 406 of the UDP packet 400 is also appropriately set to reflect the inclusion of the first, second and third routing IP addresses $T_1$, $T_2$, $T_3$ in the UDP packet 400.

Figure 5:
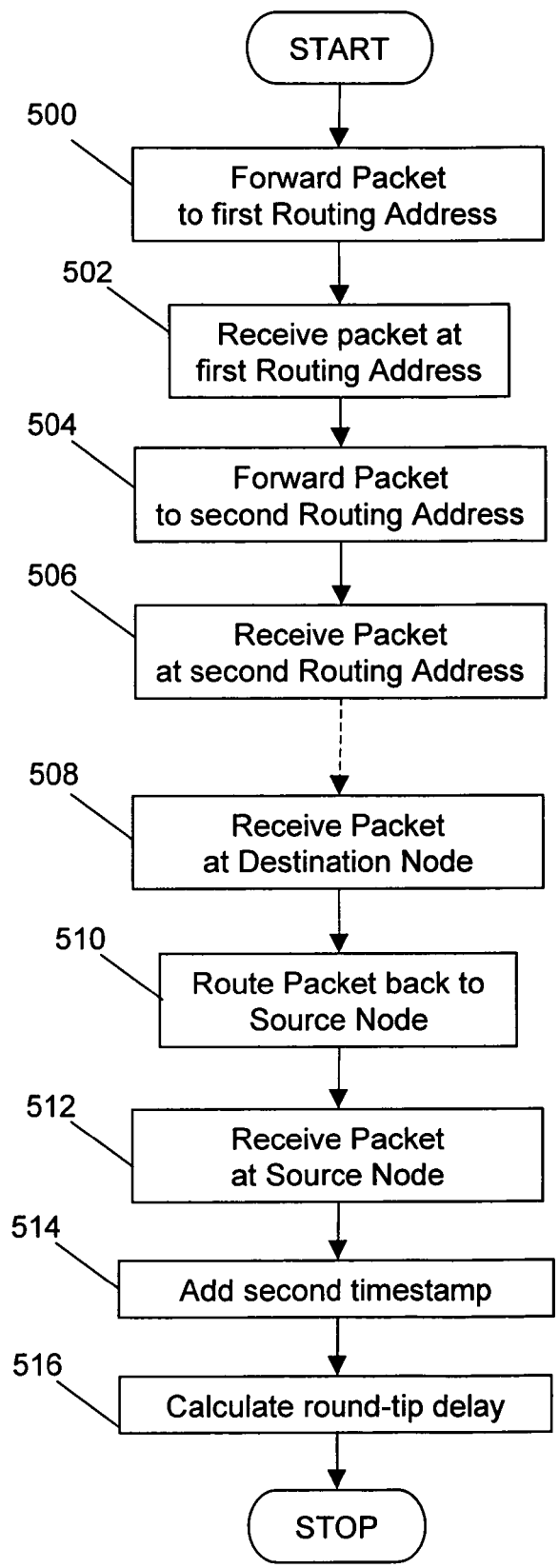
FIG. 5 is a flow diagram of a method used in conjunction with the method of FIG. 3 in a second embodiment of the invention.
Figure 6:
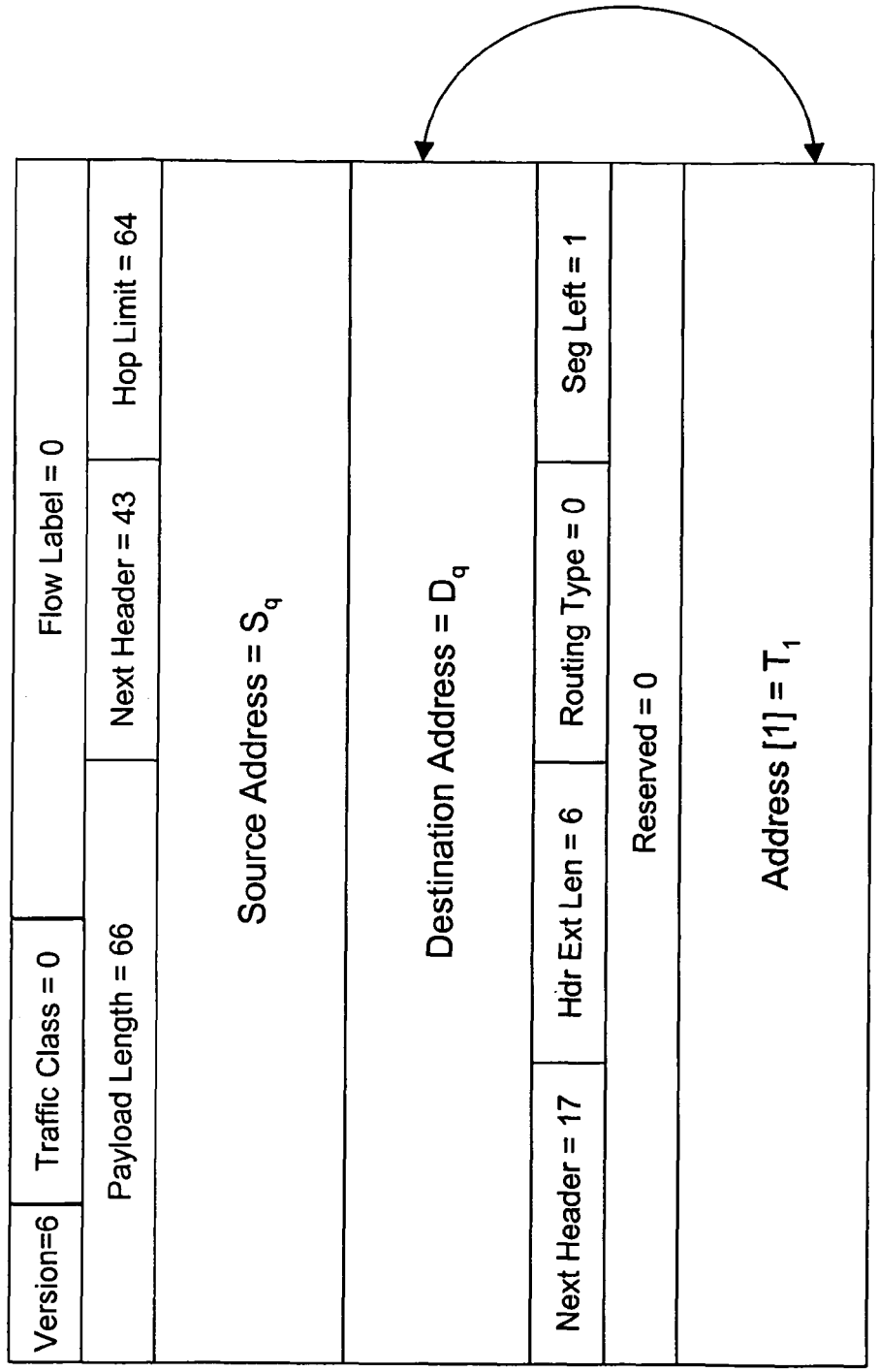
FIG. 6 is a schematic diagram of a manipulation of the data structure definition of FIG. 4.

Referring to FIGS. 5 and 6, after the UDP packet 400 has been formed and passed to the interface layer 220 in the manner already described above in relation to the previous embodiment, but prior to forwarding the UDP packet 400 ultimately to the destination IP address, the source host 102 exchanges the first routing address, $T_1$, with the content of the destination IP address field 410, namely the destination IP address, $D_q$. The second, third and fourth routing addresses $T_2$, $T_3$, $T_4$ are shifted up the queue of routing addresses so that the absence of the first routing address, $T_1$, in the routing header is filled; the place of the fourth routing address, $T_4$, is filled by the destination IP address, $D_q$.

Consequently, the UDP packet 400 is forwarded (Step 500) to the first routing address, $T_1$, corresponding to the first intermediate node 104. Thereafter, the first intermediate node 104 receives (Step 502) the UDP packet 400, whereupon the first intermediate node 104 replaces the first routing address $T_1$, residing in the destination address field 410 with the second routing address, $T_2$, from the routing header and places the first routing address, $T_1$, in the place in the queue of routing addresses vacated by the second routing address, $T_2$. Additionally, the segments left field 406 of the UDP packet 400 is decremented by unity. The UDP packet 400 is then forwarded (Step 504) to the third intermediate node 108 corresponding to the second routing address, $T_2$. The above described functionality in relation to the first intermediate node 104 is simply the normal functionality performed by a router and so it should be appreciated that the first intermediate node is not provided with any additional functionality specifically to support the BTC measurement.

Thereafter, the UDP packet 400 is received (Step 506) by the third intermediate node 108. The third intermediate node 108 replaces the second routing address $T_2$, residing in the destination address field 410 with the third routing address, $T_3$, from the routing header 402 and places the second routing address, $T_2$, in the place in the queue of routing addresses vacated by the third routing address, $T_3$. Additionally, the segments left field 406 of the UDP packet 400 is again decremented by unity. The UDP packet 400 is then forwarded to the fourth intermediate node 110 corresponding to the third routing address, $T_3$.

The above process is repeated until the UDP packet 400 reaches (Step 508) the destination node 114, whereupon the destination node recognizes that the segments left field 406 has reached unity and so a final routing address, namely the destination IP address, $D_q$, corresponding to the source host 102, only remains. Once again, the above described procedure for manipulating the destination address field 410 is performed in relation to the content of the destination address field 410, namely the fourth routing address, $T_4$, is exchanged with the destination IP address, $D_q$, corresponding to the source host 102. In this respect, the destination address field 410 is set to the destination IP address, $D_q$, stored in the routing header 402 and the place of the destination IP address, $D_q$, previously occupied in the routing header 402 is filled by the fourth routing address, $T_4$, previously stored in the destination address field 410. Thereafter, the destination node 114, in accordance with the normal routing behaviour of the destination node 114, forwards (Step 510) the UDP packet 400 to the source host 102.

Once the UDP packet 400 arrives back to the source host 102, the source host 102 then receives (Step 512) the UDP packet 400 and appends a second timestamp to the variable length payload, the second timestamp being indicative of a receipt time of the UDP packet 400. of course, the skilled person will appreciate that the return path from the destination node 114 back to the source host 102 can be predefined by the provision of further routing addresses in the routing header 402, thereby causing the UDP packet 400 to return to the source host 102 via predetermined intermediate nodes, for example, via the fifth and second intermediate nodes 112, 106.

In an analogous manner to that described above in relation to the previous embodiment, the above-described steps are performed in relation to each of the plurality of packets mentioned above and constituting test packets for the BTC measurement. During transmission and reception of the plurality of packets, the second congestion control algorithm is implemented by the Protocol Layer 218 under the control of the measurement application 214.

Upon receipt of all of the UDP packets sent by the source host 102 in relation to the BTC measurement, the measurement application 214 performs the BTC measurement in accordance with RFC 3148. Since the calculation of the BTC measurement does not differ to that described in RFC 3148, the method of calculation of the BTC measurement after receipt of the plurality of test packets with not be described further herein.

In addition to the performance of the BTC measurement, the data received by the source host 102 can be used to measure one or more of: response time, data lost in an elapsed time, data retransmitted in an elapsed time, duplicate data in an elapsed time, out of order data in an elapsed time.

Although the above examples have been described in the context of packet communications, it should be appreciated that the term "packet" is an example of a protocol data unit that can be used in relation to the above embodiments. Further, other types of protocol data units can be employed, for example: datagrams, frames, and cells and so these terms should be understood to be interchangeable.

Although the above embodiments have been described in the context of IPv6, the skilled person will appreciate that the above described techniques can be applied in the context of other communications protocols that support source-based routing.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

What is claimed is:
1. A method of forming protocol data units for measuring performance in relation to a first node of a communications network capable of supporting a congestion-aware connection in accordance with a first congestion control algorithm, the method comprising:
    generating a plurality of protocol data units, each of the plurality of protocol data units having a data structure definition supporting routing path selection and supporting congestion control in accordance with a bespoke second congestion control algorithm in place of the first congestion control algorithm, the bespoke second congestion control algorithm making congestion measurements statelessly with respect to the first node, based on connectionless data communications with the first node;
    wherein generating the plurality of protocol data units comprises:
        forming a plurality of User Datagram Protocol (UDP) packets as the protocol data units;
        inserting congestion control data supporting the congestion control in accordance with the bespoke second congestion control algorithm into a payload of each of the UDP packets; and
        inserting a corresponding first timestamp into the payload of each of the UDP packets; and
    configuring the each of the plurality of protocol data units by setting a source address, a destination address and at least one routing address in the each of the plurality of protocol data units so as to cause the plurality of protocol data units, when sent, to follow a round-trip path via the first node.

2. A method as claimed in claim 1, wherein the first congestion control algorithm is a Transmission Control Protocol algorithm.

3. A method as claimed in claim 1, wherein the congestion measurements include a Bulk Transfer Capacity measurement.

4. The method of claim 1, wherein making the congestion measurements includes:
    inserting a corresponding second timestamp into the payload of at least one of the UDP packets after said at least one UDP packet has traversed the round-trip path; and
    calculating a round-trip delay for the at least one UDP packet based on a difference between the second timestamp and the first timestamp.

5. A method of measuring performance in relation to a first node of a communications network capable of establishing a congestion-aware connection in accordance with a first congestion control algorithm, the method of measuring performance comprising:
    forming a plurality of protocol data units in accordance with a method of forming protocol data units for measuring performance in relation to a first node of a communications network capable of supporting a congestion-aware connection in accordance with a first congestion control algorithm, the method of forming protocol data units comprising:
        generating the plurality of protocol data units, each of the plurality of protocol data units having a data structure definition supporting routing path selection and supporting congestion control in accordance with a bespoke second congestion control algorithm in place of the first congestion control algorithm, the bespoke second congestion control algorithm making congestion measurements statelessly with respect to the first node, based on connectionless data communications with the first node;
        wherein generating the plurality of protocol data units comprises:
            forming a plurality of User Datagram Protocol (UDP) packets as the protocol data units;
            inserting congestion control data supporting the congestion control in accordance with the bespoke second congestion control algorithm into a payload of each of the UDP packets; and
            inserting a corresponding first timestamp into the payload of each of the UDP packets; and
        configuring the each of the plurality of protocol data units by setting a source address, a destination address and at least one routing address in the each of the plurality of protocol data units so as to cause the plurality of protocol data units, when sent, to follow a round-trip path via the first node.

6. The method of claim 5, wherein making the congestion measurements includes:
    inserting a corresponding second timestamp into the payload of at least one of the UDP packets after said at least one UDP packet has traversed the round-trip path; and
    calculating a round-trip delay for the at least one UDP packet based on a difference between the second timestamp and the first timestamp.

7. A protocol data unit generation apparatus for forming protocol data units to measure performance in relation to a first node of a communications network capable of supporting a congestion-aware connection in accordance with a first congestion control algorithm, the apparatus comprising:
    a processing resource arranged to generate, when in use, a plurality of protocol data units, each of the plurality of protocol data units having a data structure definition supporting routing path selection and supporting congestion control in accordance with a bespoke second congestion control algorithm in place of the first congestion control algorithm, the bespoke second congestion control algorithm making congestion measurements statelessly with respect to the first node, based on connectionless data communications with the first node;
    wherein the processing resource is configured to generate, when in use, the plurality of protocol data units by:
        forming a plurality of User Datagram Protocol (UDP) packets as the protocol data units;
        inserting congestion control data supporting the congestion control in accordance with the bespoke second congestion control algorithm into a payload of each of the UDP packets; and
        inserting a corresponding first timestamp into the payload of each of the UDP packets; and
    wherein the processing resource is further arranged to configure, when in use, the each of the plurality of protocol data units by setting a source address, a destination address and at least one routing address in the each of the plurality of protocol data units so as to cause the plurality of protocol data units when sent, to follow a roundtrip path via the first node.

8. The apparatus of claim 7, wherein the processing resource is configured to:
    insert a corresponding second timestamp into the payload of at least one of the UDP packets after said at least one UDP packet has traversed the round-trip path; and
    calculate a round-trip delay for the at least one UDP packet based on a difference between the second timestamp and the first timestamp.

9. A network measurement apparatus comprising a protocol data unit generation apparatus for forming protocol data units to measure performance in relation to a first node of a communications network capable of supporting a congestion-aware connection in accordance with a first congestion control algorithm, the apparatus comprising:

a processing resource arranged to generate, when in use, a plurality of protocol data units, each of the plurality of protocol data units having a data structure definition supporting routing path selection and supporting congestion control in accordance with a bespoke second congestion control algorithm in place of the first congestion control algorithm, the bespoke second congestion control algorithm making congestion measurements statelessly with respect to the first node, based on connectionless data communications with the first node;

wherein the processing resource is configured to generate, when in use, the plurality of protocol data units by:

forming a plurality of User Datagram Protocol (UDP) packets as the protocol data units;

inserting congestion control data supporting the congestion control in accordance with the bespoke second congestion control algorithm into a payload of each of the UDP packets; and inserting a corresponding first timestamp into the payload of each of the UDP packets; and wherein the processing resource is further arranged to configure, when in use, the each of the plurality of protocol data units by setting a source address, a destination address and at least one routing address in the each of the plurality of protocol data units so as to cause the plurality of protocol data units when sent, to follow a roundtrip path via the first node.

10. The apparatus of claim 9, wherein the processing resource is configured to:

insert a corresponding second timestamp into the payload of at least one of the UDP packets after said at least one UDP packet has traversed the round-trip path; and calculate a round-trip delay for the at least one UDP packet based on a difference between the second timestamp and the first timestamp.

11. A communications system comprising a protocol data unit generation apparatus for forming protocol data units to measure performance in relation to a first node of a communications network capable of supporting a congestion-aware connection in accordance with a first congestion control algorithm, the apparatus comprising:

a processing resource arranged to generate, when in use, a plurality of protocol data units, each of the plurality of protocol data units having a data structure definition supporting routing path selection and supporting congestion control in accordance with a bespoke second congestion control algorithm in place of the first congestion control algorithm, the bespoke second congestion control algorithm making congestion measurements statelessly with respect to the first node, based on connectionless data communications with the first node;

wherein the processing resource is configured to generate, when in use, the plurality of protocol data units by:

forming a plurality of User Datagram Protocol (UDP) packets as the protocol data units;

inserting congestion control data supporting the congestion control in accordance with the bespoke second congestion control algorithm into a payload of each of the UDP packets; and inserting a corresponding first timestamp into the payload of each of the UDP packets; and wherein the processing resource is further arranged to configure, when in use, the each of the plurality of protocol data units by setting a source address, a destination address and at least one routing address in the each of the plurality of protocol data units so as to cause the plurality of protocol data units when sent, to follow a roundtrip path via the first node.

12. The apparatus of claim 11, wherein the processing resource is configured to:

insert a corresponding second timestamp into the payload of at least one of the UDP packets after said at least one UDP packet has traversed the round-trip path; and calculate a round-trip delay for the at least one UDP packet based on a difference between the second timestamp and the first timestamp.

13. A non-transitory data storage medium of a source node of a communications network, comprising:

a plurality of protocol data units stored in the non-transitory data storage medium, the plurality of protocol data units for transmission from the non-transitory data storage medium over the communications network, for measuring performance in relation to a first node of the communications network capable of supporting a congestion-aware connection in accordance with a first congestion control algorithm, each of the plurality of protocol data units having a data structure definition supporting routing path selection and supporting congestion control in accordance with a bespoke second congestion control algorithm in place of the first congestion control algorithm, the bespoke second congestion control algorithm making congestion measurements statelessly with respect to the first node, based on connectionless data communications with the first node;

wherein each of the plurality of protocol data units comprises a User Datagram Protocol (UDP) packet having a packet payload, wherein the packet payload includes;

congestion control data supporting the congestion control in accordance with the bespoke second congestion control algorithm; and a timestamp corresponding to a departure time of the UDP packet from the source node; and wherein a source address of the source node, a destination address and at least one routing address in the each of the plurality of protocol data units is set so as to cause the plurality of protocol data units, when sent, to follow a round-trip path via the first node.

* * * * *